(12) United States Patent
Brigandi et al.

(10) Patent No.: US 12,269,960 B2
(45) Date of Patent: Apr. 8, 2025

(54) POLYOLEFIN COMPOSITION

(71) Applicant: Dow Global Technologies LLC, Midland, MI (US)

(72) Inventors: Paul J. Brigandi, Schwenksville, PA (US); Jeffrey M. Cogen, Flemington, NJ (US); Jeffrey C. Munro, Bellaire, TX (US); Colin Li Pi Shan, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 555 days.

(21) Appl. No.: 17/756,668

(22) PCT Filed: Dec. 11, 2020

(86) PCT No.: PCT/US2020/064414
§ 371 (c)(1),
(2) Date: May 31, 2022

(87) PCT Pub. No.: WO2021/126671
PCT Pub. Date: Jun. 24, 2021

(65) Prior Publication Data
US 2022/0411658 A1    Dec. 29, 2022

Related U.S. Application Data

(60) Provisional application No. 62/950,157, filed on Dec. 19, 2019.

(51) Int. Cl.
C09D 123/06 (2006.01)
C09D 123/08 (2006.01)
H01B 3/44 (2006.01)

(52) U.S. Cl.
CPC ..... C09D 123/0815 (2013.01); C09D 123/06 (2013.01); H01B 3/441 (2013.01)

(58) Field of Classification Search
CPC . C09D 123/0815; C09D 123/06; C08L 23/06; C08L 23/08; C08K 5/5425; C08K 5/14
See application file for complete search history.

(56) References Cited

U.S. PATENT DOCUMENTS

| | | | |
|---|---|---|---|
| 4,005,254 A * | 1/1977 | MacKenzie, Jr. | C08F 255/02 174/110 PM |
| 4,018,852 A | 4/1977 | Schober | |
| 5,246,783 A | 9/1993 | Spenadel et al. | |
| 5,346,961 A | 9/1994 | Shaw et al. | |
| 6,277,925 B1 | 8/2001 | Biswas et al. | |
| 6,404,971 B2 | 6/2002 | Mehl | |
| 6,496,629 B2 | 12/2002 | Ma et al. | |
| 6,714,707 B2 | 3/2004 | Rossi et al. | |
| 8,426,519 B2 * | 4/2013 | Cogen | C08L 23/00 525/100 |
| 11,472,896 B2 | 10/2022 | Yang et al. | |
| 2003/0166817 A1 | 9/2003 | Barfurth et al. | |
| 2011/0117318 A1 * | 5/2011 | Zuercher | C08J 3/28 525/240 |
| 2015/0376386 A1 | 12/2015 | Kim et al. | |
| 2020/0199270 A1 | 6/2020 | Zhang et al. | |

FOREIGN PATENT DOCUMENTS

| | | |
|---|---|---|
| WO | 2014130948 A1 | 8/2014 |
| WO | 2016187755 | 12/2016 |
| WO | 2018200319 A1 | 11/2018 |
| WO | 2019000311 A1 | 1/2019 |
| WO | 2019000654 A1 | 1/2019 |
| WO | 2019046088 A1 | 3/2019 |
| WO | 2019084773 | 5/2019 |
| WO | 2019148407 A1 | 8/2019 |

OTHER PUBLICATIONS

PCT/US2020/064414, International Search Report and Written Opinion with a mailing date of Apr. 1, 2021.

\* cited by examiner

*Primary Examiner* — Robert C Boyle

(57) ABSTRACT

A crosslinkable polyolefin composition comprising an ethylene/alpha-olefin copolymer elastomer having a melt index from 0.6 to 6.2 grams per 10 minutes, a crosslinking effective amount of an alkenyl-functional monocyclic organosiloxane, and from 0.29 to 0.44 wt % of an organic peroxide; products made therefrom; methods of making and using same; and articles containing same.

11 Claims, No Drawings

POLYOLEFIN COMPOSITION

Patents and patent application publications in the field include CN104277182A; US 2003/0166817 A1; US 2015/0376386 A1; U.S. Pat. Nos. 4,005,254; 8,426,519 B2; WO 2014/130948 A1; WO 2018/200319 A1; WO 2019/000311 A1; and WO 2019/000654 A1. Literature in the field includes LIU Gang, et al., *Study on cyclosiloxane containing vinylphenyl as crosslinking agent in polypropylene*, NEW CHEMICAL MATERIALS, 2006, volume 34, number 10, pages 78-80.

INTRODUCTION

Insulated electrical conductors typically comprise a conductive core covered by an insulation layer. The conductive core may be solid or stranded (e.g., a bundle of wires). Some insulated electrical conductors may also contain one or more additional elements such as semiconducting layer(s) and/or a protective jacket (e.g., wound wire, tape, or sheath). Examples are coated metal wires and electrical power cables, including those for use in low voltage ("LV", >0 to <5 kilovolts (kV)), medium voltage ("MV", 5 to <69 kV), high voltage ("HV", 69 to 230 kV) and extra-high voltage ("EHV", >230 kV) electricity-transmitting/distributing applications. Evaluations of power cables may use AEIC/ICEA standards and/or IEC test methods.

WO 2018/200319 A1 recognized that a power cable's operating temperature may be greater than ambient temperature. Therefore, the wire and cable industry typically desire an insulation layer be made from a networked polymer that has low elongation under stress at elevated temperature ("hot creep") in field use.

The networked polymer is made by curing a crosslinkable polymer after the crosslinkable polymer has been extruded as an uncured insulation layer directly onto a wire, or onto an inner semiconducting layer that is covering the wire. The crosslinkable polymer must have a high enough melt flow rate that enables extruding it. But the higher the melt flow rate of the crosslinkable polymer the higher the networked polymer's hot creep during field use. Various types of crosslinkable polymers/networked polymers that balance these competing property requirements are known to the industry. These include crosslinkable polyolefins and their crosslinked polyolefin products (networked polymers). In the case of crosslinkable polyethylenes the melt flow rate (melt index) that the industry desires is 2 grams per 10 minutes measured at 190 degrees Celsius (° C.), 2.16 kilograms (kg), ASTM D1238-04, "melt index" or $I_2$".

WO 2019/000654 A1 recognized that a problem that hurts the crosslinking and performance of prior polyolefins. Coagents may be blended with polyolefins to give polyolefin compositions with increased crosslinking capability, but conventional coagents have their limitations. For example, a conventional coagent typically has limited solubility or miscibility in polyolefin compositions. This limits the coagent's maximum loading level in the composition. It also causes the coagent to undesirably migrate to the surface of the composition (e.g., surface of pellets), limiting the composition's storage lifetime. Conventional coagents also pose other problems. For example, upon curing they may yield crosslinked products with insufficient extent of crosslinking. Or the compositions may cure too slowly for use in certain manufacturing operations (e.g., power cable manufacturing, injection molding, and film extrusion). Or the compositions may cure prematurely (i.e., to be prone to scorch during cable extrusion, injection molding, and film extrusion). Not surprisingly, these problems have limited the structures of conventional coagents that have been used with polyolefins. Typically, conventional coagents comprise conventional sub-structural groups bonded to two or more olefinic crosslinking groups. The conventional sub-structural groups are acyclic or cyclic multivalent groups that comprise a backbone or ring, respectively, containing in the backbone or ring carbon atoms and, optionally, nitrogen and/or oxygen atoms, but not silicon atoms.

The problem hurts the performance of power cables operating at higher voltages. Scorch can occur during extrusion of, and ultimately lead to failure of, the insulation layer. The time to reach such failure can be lengthened, and thus reliability of power delivery increased and maintenance costs decreased, by using a more resilient material in the insulation layer.

WO 2019/000654 A1 solves its problem by using a coagent that is an alkenyl-functional monocyclic organosiloxane. A crosslinkable polyolefin composition comprising a crosslinking effective amount of the alkenyl-functional monocyclic organosiloxane may also comprise from 0.01 to 4.5 weight percent (wt %) of an organic peroxide based on total weight of the crosslinkable polyolefin composition. Examples with 0.50 wt % of dicumyl peroxide are disclosed.

SUMMARY

We discovered that as the loading of the organic peroxide drops much below 0.50 wt %, the crosslinkable polyolefin composition may fail to achieve a satisfactory hot creep performance, also known as hot set performance. A more rigorous global standard for power cable applications is hot creep of less than (<) 175 percent (%) when kept at 200° C. for 15 minutes. If the crosslinkable polyolefin composition of an insulation layer of a power cable has hot creep of greater than (>) 175% after being kept at 200° C. for 15 minutes, the insulation layer may sag or deform during operation at elevated temperature. The more the hot creep exceeds 175%, the faster and/or more the insulation layer may sag or deform.

Although power cables may not experience operating temperatures as high as 200° C., the hot creep test is a reliable way for the industry to evaluate materials for use in insulation layers thereof. In the power cable industry, a hot creep of <175% after the test sample has been held for 15 minutes at 200° C. passes the hot creep test. And a hot creep of <100% after 15 minutes at 200° C. is especially desirable. Also, the residual elongation at room temperature should be <15% of the hot creep value measured at 200° C.

Our technical solution to this problem includes a polyolefin composition comprising a carrier mixture and, optionally, one or more additives, wherein the carrier mixture comprises an ethylene/alpha-olefin copolymer elastomer having a melt index from 0.6 to 6.2 grams per 10 minutes (g/10 min.), a crosslinking effective amount of an alkenyl-functional monocyclic organosiloxane, and from 0.29 to 0.44 wt % of an organic peroxide. Also included is a crosslinked polyolefin product made by curing same; methods of making and using same; and articles containing same. The carrier mixture has satisfactory hot creep. Depending upon the amount and type of any optional additive, the crosslinkable polyolefin composition itself may also have satisfactory hot creep.

The inventive polyolefin composition and products are useful in any application in which polyolefins, including crosslinked polyolefins, are utilized, including extruded articles, coatings, films, sheets and injection molded articles, as well as electricity transmitting applications and other unrelated applications such as containers or vehicle parts.

DETAILED DESCRIPTION

Embodiments of the technical solution follow, some numbered for easy reference.

Aspect 1. A crosslinkable polyolefin composition comprising from 100 to 30 weight percent (wt %) of a carrier mixture and from 0 to 70 wt %, respectively, of one or more optional additives; wherein the carrier mixture consists of from 97.56 to 99.31 weight percent (wt %) of (A) a polyethylene polymer, from 0.40 to 2.0 wt % of an alkenyl-functional monocyclic organosiloxane, and from 0.29 to 0.44 wt % of (C) an organic peroxide; wherein the (A) polyethylene polymer is selected from (A1) and (A2): (A1) an ethylene/alpha-olefin copolymer elastomer having a melt index from 0.6 to 6.2 grams per 10 minutes (g/10 min.) and a density of from 0.854 to 0.912 gram per cubic centimeter ($g/cm^3$), measured according to ASTM D792-13, Method B or (A2) a blend of (A1) and a low-density polyethylene (LDPE) having a melt index of 0.8 to 2.5 g/10 min., wherein the blend has a mass ratio of weight of (A1)-to-weight of (LDPE) ((A1)/(LDPE) wt/wt) of from 99.9/0.1 to 1.0/3.0, alternatively from 99.9/0.1 to 1.0/2.0, alternatively from 99.9/0.1 to 1.0/1.0, alternatively 99.9/0.1 to 2.5/1.0 and wherein both melt indexes measured according to ASTM D1238-04 (190° C., 2.16 kg; "$I_2$"); wherein the (B) alkenyl-functional monocyclic organosiloxane is of formula (I): $[R^1,R^2SiO_{2/2}]n$ (I), wherein subscript n is an integer greater than or equal to 3; each $R^1$ is independently a $(C_2-C_4)$alkenyl or a $H_2C=C(R^{1a})-C(=O)-O-(CH_2)_m-$ wherein $R^{1a}$ is H or methyl and subscript m is an integer from 1 to 4; and each $R^2$ is independently H, $(C_1-C_4)$alkyl, phenyl, or $R^1$; and wherein the carrier mixture of the crosslinkable polyolefin composition has a hot creep of less than 175% after being kept at 200° C. for 15 minutes, as measured by the Hot Creep Test Method (described later); with the proviso that the crosslinkable polyolefin composition is free of (i.e., lacks) a phosphazene base; and with the proviso that if the melt index ($I_2$) of the (A1) ethylene/alpha-olefin copolymer elastomer is greater than 2 g/10 min., the amount of (C) organic peroxide is from 0.35 to 0.44 wt % of the carrier mixture. The total weight of constituents (A), (B), and (C) is 100.00 wt % of the carrier mixture. The total weight of constituents (A), (B), (C), and the one or more optional additives, if any, is 100.00 wt % of the crosslinkable polyolefin composition. The crosslinkable polyolefin composition may be free of any ring-opening catalyst. In some embodiments the (A1) ethylene/alpha-olefin copolymer elastomer is an ethylene/1-octene copolymer elastomer or an ethylene/1-butene copolymer elastomer, alternatively (A1) is the ethylene/1-octene copolymer elastomer, alternatively (A1) is the ethylene/1-butene copolymer elastomer. In some embodiments the hot creep value is from 23% to 145%, alternatively from 23% to 87%, alternatively from 23% to 82%, alternatively from 24% to 45%, alternatively from 24% to 29%.

Aspect 2. The crosslinkable polyolefin composition of aspect 1 wherein the (A) polyethylene polymer is further defined by any one of limitations (i) to (vii): (i) the (A) polyethylene polymer is the (A1) ethylene/alpha-olefin copolymer elastomer; (ii) the (A) polyethylene polymer is the (A1) ethylene/alpha-olefin copolymer elastomer and (A1) is an ethylene/1-octene copolymer having a melt index from 0.80 to 5.4 g/10 min., alternatively from 0.9 to 5.1 g/10 min. and a density of from 0.855 to 0.912 $g/cm^3$, alternatively from 0.855 to 0.910 $g/cm^3$; (iii) the (A) polyethylene polymer is the (A1) ethylene/alpha-olefin copolymer elastomer and (A1) is an ethylene/1-butene copolymer having a melt index from 0.80 to 5.4 g/10 min., alternatively from 1.1 to 5.1 g/10 min. and a density of from 0.859 to 0.890 $g/cm^3$, alternatively from 0.861 to 0.890 $g/cm^3$; (iv) the (A) polyethylene polymer is the (A2) blend and (A2) is a blend of the ethylene/alpha-olefin copolymer elastomer of any one of limitations (i) to (iii) and the LDPE is an LDPE having a melt index ($I_2$) of from 1.75 to 2.49 g/10 min. and a density of from 0.918 to 0.920 $g/cm^3$; (v) the (A) polyethylene polymer is the (A2) blend and (A2) is a blend of the ethylene/alpha-olefin copolymer elastomer of any one of limitations (i) to (iii) and the LDPE is an LDPE having a melt index ($I_2$) of 2.4 g/10 min. and a density of 0.920 $g/cm^3$; (vi) the (A) polyethylene polymer is the (A2) blend and (A2) is a blend of the ethylene/alpha-olefin copolymer elastomer of any one of limitations (i) to (iii) and the LDPE is an LDPE having a melt index ($I_2$) of 1.9 g/10 min. and a density of 0.9183 $g/cm^3$; and (vii) the (A) polyethylene polymer is the (A2) blend and (A2) is a blend of the ethylene/alpha-olefin copolymer elastomer of any one of limitations (i) to (iii) and the LDPE is an LDPE having a melt index ($I_2$) from 0.80 to 1.24 g/10 min. and a density of from 0.917 to 0.923 $g/cm^3$. The (A) polyethylene polymer may be from 98.2 to 98.6 wt % of the carrier mixture and/or the carrier mixture may be from 99.4 to 99.90 wt % of the crosslinkable polyolefin composition.

Aspect 3. The crosslinkable polyolefin composition of aspect 1 or 2 wherein subscript n is 4 and the (B) monocyclic organosiloxane of formula (I) is described by any one of limitations (i) to (x): (i) each $R^1$ is independently a $(C_2-C_3)$ alkenyl; and each $R^2$ is independently H, $(C_1-C_2)$alkyl, or $(C_2-C_3)$alkenyl; (ii) each $R^1$ is vinyl; and each $R^2$ is independently $(C_1-C_2)$alkyl; (iii) each $R^1$ is vinyl; and each $R^2$ is methyl; (iv) each $R^1$ is allyl; and each $R^2$ is independently $(C_1-C_2)$alkyl; (v) each $R^1$ is allyl; and each $R^2$ is methyl; (vi) each $R^1$ is independently $H_2C=C(R^{1a})-C(=O)-O-(CH_2)_m-$ wherein $R^{1a}$ is H or methyl and subscript m is an integer from 1 to 4; and each $R^2$ is independently H, $(C_1-C_2)$alkyl, or $(C_2-C_3)$alkenyl; (vii) each $R^1$ is independently $H_2C=C(R^{1a})-C(=O)-O-(CH_2)_m-$ wherein $R^{1a}$ is H and subscript m is 3; and each $R^2$ is independently $(C_1-C_2)$alkyl; (viii) each $R^1$ is independently $H_2C=C(R^{1a})-C(=O)-O-(CH_2)_m-$ wherein $R^{1a}$ is methyl and subscript m is 3; and each $R^2$ is independently $(C_1-C_2)$alkyl; (ix) the crosslinkable polyolefin composition does not contain 24 wt % or more of, alternatively does not contain 22 wt % or more of, alternatively does not contain 20.0 wt % or more of, alternatively does not contain 15 wt % or more of, alternatively does not contain 10 wt % or more of, alternatively is free of any inorganic filler; and (x) a combination of limitation (ix) and any one of limitations (i) to (viii). In some aspects the (B) monocyclic organosiloxane of formula (I) is 2,4,6,8-tetramethyl-2,4,6,8-tetravinyl-cyclotetrasilasane, "$(D^{Vi})_4$" (CAS No. 2554-06-5).

Aspect 4. The crosslinkable polyolefin composition of any one of aspects 1 to 3 further comprising from 0.01 to 0.10 wt % of (D) an anti-scorch agent or from 0.10 to 0.30 wt % of (E) an antioxidant or a combination of (D) and (E); and wherein an embodiment of the crosslinkable polyolefin composition consisting of constituents (A) to (E) has a hot creep of less than 175% after being kept at 200° C. for 15 minutes, as measured by the Hot Creep Test Method. In some aspects (D) is alpha-methyl styrene dimer (AMSD) and (E) is 4,6-bis(octylthiomethyl)-2-methyl-phenol (also known as 4,6-bis(octylthiomethyl)-ortho-cresol). In some embodiments of any one of aspects 1 to 6 the embodiment of the crosslinkable polyolefin composition consisting of constituents (A) to (E) also has a significant extent of crosslinking as indicated by MH greater than (>) 2.0 dN-m, alternatively >2.5 dN-m, alternatively >3.0 dN-m (e.g., from 2.5 to 4.0 dN-m), as measured by the Moving Die Rheometer Test Method (described later). In some embodiments the MH value is from 2.1 to 5.4 dN-m, alternatively from 2.7 to 5.1 dN-m, alternatively from 2.8 to 5.1 dN-m, alternatively from 3.1 to 5.1 dN-m, alternatively from 3.7 to 5.1 dN-m. The working inventive examples IE1 to IE6 described later have shown that the embodiment of the crosslinkable polyolefin composition that consists of constituents (A) to (E) is shown to have the hot creep of less than 175% after being kept at 200° C. for 15 minutes, as measured by the Hot Creep Test Method, and the significant extent of crosslinking as indicated by MH greater than (>) 2.0 dN-m, alternatively >2.5 dN-m, alternatively >3.0 dN-m (e.g., from 2.5 to 4.0 dN-m), as measured by the Moving Die Rheometer Test Method. In some embodiments the MH value is as described above and the hot creep value is from 23% to 145%, alternatively from 23% to 87%, alternatively from 23% to 82%, alternatively from 24% to 45%, alternatively from 24% to 29%.

Aspect 5. The crosslinkable polyolefin composition of any one of aspects 1 to 4 wherein the crosslinkable composition comprises the carrier mixture and the one or more additives; wherein the one or more additives are selected from the group consisting of additives (F) to (M): (F) a filler; (G) a flame retardant; (H) a hindered amine stabilizer; (I) a tree retardant; (J) a methyl radical scavenger; (K) a conventional coagent, (L) a nucleating agent, and (M) carbon black; with the proviso that the (F) filler does not include any previously omitted filler. The total amount of the one or more additives (F) to (M) may be from 0.1 to 69 wt %, alternatively from 0.1 to 20 wt %, alternatively from 0.1 to 10 wt %, alternatively from 0.1 to 5.0 wt %, of the crosslinkable polyolefin composition and the carrier mixture may be from 99.9 to 31 wt %, alternatively from 99.9 to 80 wt %, alternatively from 99.9 to 90 wt %, alternatively from 99.9 to 95.0 wt % of the crosslinkable polyolefin composition, respectively. In some aspects the crosslinkable polyolefin composition is any one of inventive examples IE1 to IE6, alternatively any one of IE1 to IE3, IE5, and IE6, described later.

Aspect 6. A method of making the crosslinkable polyolefin composition of aspect 1, the method comprising mixing the amount of the (A) polyethylene polymer; the amount of the (B) monocyclic organosiloxane of formula (I), and the amount of the (C) organic peroxide together to make the carrier mixture.

Aspect 7. A method of free-radical curing the crosslinkable polyolefin composition of any one of aspects 1 to 5 to make a crosslinked polyolefin product, the method comprising heating the crosslinkable polyolefin composition at a curing effective temperature in such a way so as to react the (A) polyethylene polymer with the (B) monocyclic organosiloxane of formula (I), thereby making a crosslinked polyolefin product. The crosslinked polyolefin product is free of a phosphazene base, alternatively any ring-opening catalyst and a product made therefrom. In some aspects the crosslinkable polyolefin composition made by the method is the crosslinkable polyolefin composition of any one of aspects 1 to 5.

Aspect 8. A crosslinked polyolefin product made by the method of curing of aspect 7. In some embodiments the crosslinkable polyolefin composition, after being held at 182° C. in a moving die rheometer for 12 minutes, makes an embodiment of the crosslinked polyolefin product having a significant extent of crosslinking as indicated by MH greater than (>) 2.0 dN-m, alternatively >2.5 dN-m, alternatively >3.0 dN-m. These values are remarkable achievements in just 12 minutes. In some embodiments the MH value is from 2.1 to 5.4 dN-m, alternatively from 2.7 to 5.1 dN-m, alternatively from 2.8 to 5.1 dN-m, alternatively from 3.1 to 5.1 dN-m, alternatively from 3.7 to 5.1 dN-m.

Aspect 9. A manufactured article comprising a shaped form of the crosslinkable polyolefin composition of any one of aspects 1 to 5 or the crosslinked polyolefin product of aspect 10. In some aspects the manufactured article is selected from: coatings, films, sheets, extruded articles, and injection molded articles. E.g., coated conductors, coatings of wire and cables for transmitting electric power or telecommunications, agricultural film, food packaging, garment bags, grocery bags, heavy-duty sacks, industrial sheeting, pallet and shrink wraps, bags, buckets, freezer containers, lids, toys.

Aspect 10. A coated conductor comprising a conductive core and an insulation layer at least partially covering the conductive core, wherein at least a portion of the insulation layer comprises the crosslinkable polyolefin composition of any one of aspects 1 to 5 or the crosslinked polyolefin product of aspect 8. Embodiments of the conductive core may be a wire having proximal and distal ends, at least one of which may be free of the insulation layer.

Aspect 11. A method of transmitting electricity, the method comprising applying a voltage across the conductive core of the coated conductor of aspect 10 so as to generate a flow of electricity through the conductive core. The conductive core may be a wire having proximal and distal ends and the electricity may flow from one end to the other end of the wire.

The crosslinkable polyolefin composition and crosslinked polyolefin product made therefrom may be free of a telechelic polyolefin and crosslinked polyolefin product made therefrom, respectively. A telechelic polyolefin molecule has a main chain that has a terminal alkenyl group at each end.

In some aspects the crosslinkable polyolefin composition is of aspect 1 or 2 wherein subscript n is 3 and the (B) monocyclic organosiloxane of formula (I) is described by any one of limitations (i) to (x): (i) each $R^1$ is independently a $(C_2-C_3)$alkenyl; and each $R^2$ is independently H, $(C_1-C_2)$alkyl, or $(C_2-C_3)$alkenyl; (ii) each $R^1$ is vinyl; and each $R^2$ is independently $(C_1-C_2)$alkyl; (iii) each $R^1$ is vinyl; and each $R^2$ is methyl; (iv) each $R^1$ is allyl; and each $R^2$ is independently $(C_1-C_2)$alkyl; (v) each $R^1$ is allyl; and each $R^2$ is methyl; (vi) each $R^1$ is independently $H_2C=C(R^{1a})-C(=O)-O-(CH_2)_m-$ wherein $R^{1a}$ is H or methyl and subscript m is an integer from 1 to 4; and each $R^2$ is independently H, $(C_1-C_2)$alkyl, or $(C_2-C_3)$alkenyl; (vii) each $R^1$ is independently $H_2C=C(R^{1a})-C(=O)-O-(CH_2)_m-$ wherein $R^{1a}$ is H and subscript m is 3; and each $R^2$ is independently $(C_1-C_2)$alkyl; (viii) each $R^1$ is independently $H_2C=C(R^{1a})-C(=O)-O-(CH_2)_m-$ wherein $R^{1a}$ is methyl and subscript m is 3; and each $R^2$ is independently $(C_1-C_2)$alkyl; (ix) the crosslinkable polyolefin composition does not contain 24 wt % or more of, alternatively does not contain 22 wt % or more of, alternatively does not contain 20.0 wt % or more of, alternatively does not contain 15 wt % or more of, alternatively does not contain 10 wt % or more of, alternatively is free of an inorganic filler selected from the group consisting of aluminum oxide, aluminum silicate, calcium silicate, magnesium silicate, silica, titanium dioxide, and mixtures thereof; and (x) a combination of limitation (ix) and any one of limitations (i) to (viii).

In some aspects the crosslinkable polyolefin composition is of aspect 1 or 2 wherein subscript n is 5 or 6 and the (B) monocyclic organosiloxane of formula (I) is described by any one of limitations (i) to (x): (i) each $R^1$ is independently a $(C_2$-$C_3)$alkenyl; and each $R^2$ is independently H, $(C_1$-$C_2)$alkyl, or $(C_2$-$C_3)$alkenyl; (ii) each $R^1$ is vinyl; and each $R^2$ is independently $(C_1$-$C_2)$alkyl; (iii) each $R^1$ is vinyl; and each $R^2$ is methyl; (iv) each $R^1$ is allyl; and each $R^2$ is independently $(C_1$-$C_2)$alkyl; (v) each $R^1$ is allyl; and each $R^2$ is methyl; (vi) each $R^1$ is independently $H_2C=C(R^{1a})-C(=O)-O-(CH_2)_m-$ wherein $R^{1a}$ is H or methyl and subscript m is an integer from 1 to 4; and each $R^2$ is independently H, $(C_1$-$C_2)$alkyl, or $(C_2$-$C_3)$alkenyl; (vii) each $R^1$ is independently $H_2C=C(R^{1a})-C(=O)-O-(CH_2)_m-$ wherein $R^{1a}$ is H and subscript m is 3; and each $R^2$ is independently $(C_1$-$C_2)$alkyl; (viii) each $R^1$ is independently $H_2C=C(R^{1a})-C(=O)-O-(CH_2)_m-$ wherein $R^{1a}$ is methyl and subscript m is 3; and each $R^2$ is independently $(C_1$-$C_2)$alkyl; (ix) the crosslinkable polyolefin composition does not contain 24 wt % or more of, alternatively does not contain 22 wt % or more of, alternatively does not contain 20.0 wt % or more of, alternatively does not contain 15 wt % or more of, alternatively does not contain 10 wt % or more of, alternatively is free of an inorganic filler selected from the group consisting of aluminum oxide, aluminum silicate, calcium silicate, magnesium silicate, silica, titanium dioxide, and mixtures thereof; and (x) a combination of limitation (ix) and any one of limitations (i) to (viii).

In some aspects the crosslinkable polyolefin composition is free of any ring opening catalyst. In some aspects when subscript n is 4, the crosslinkable polyolefin composition does not contain 24 wt % or more of, alternatively does not contain 22 wt % or more of, alternatively does not contain 20.0 wt % or more of, alternatively does not contain 15 wt % or more of, alternatively does not contain 10 wt % or more of, alternatively is free of an inorganic filler selected from the group consisting of aluminum oxide, aluminum silicate, calcium silicate, magnesium silicate, silica, titanium dioxide, and mixtures thereof. In some aspects n is 3, 4, 5, or 6; alternatively 3, 4, or 5; alternatively 5 or 6; alternatively 3 or 4; alternatively 3; alternatively 4; alternatively 5; alternatively 6.

The carrier mixture of the crosslinkable polyolefin composition has a hot creep of less than 175% after being kept at 200° C. for 15 minutes, alternatively a hot creep of <100% after being kept at 200° C. for 15 minutes. Depending upon the amount and type of any optional additive, the crosslinkable polyolefin composition itself may also have a hot creep of less than 175% after being kept at 200° C. for 15 minutes, alternatively a hot creep of <100% after being kept at 200° C. for 15 minutes. In some embodiments the hot creep value is from 23% to 145%, alternatively from 23% to 87%, alternatively from 23% to 82%, alternatively from 24% to 45%, alternatively from 24% to 29%. Without being bound by theory, it is believed that as the higher the melt index ($I_2$) of the (A1) ethylene/alpha-olefin copolymer elastomer is above 2.0 g/10 min., the higher the loading of the (C) organic peroxide that is desired for the carrier mixture achieving the hot creep of less than 175% after being kept at 200° C. for 15 minutes. This is the reason for the proviso that if the melt index ($I_2$) of the (A1) ethylene/alpha-olefin copolymer elastomer is greater than 2 g/10 min., the amount of (C) organic peroxide is from 0.35 to 0.44 wt %.

In some embodiments the carrier mixture of the crosslinkable polyolefin composition, after being held at 182° C. in a moving die rheometer for 12 minutes, makes a crosslinked polyolefin product having a significant extent of crosslinking as indicated by MH greater than (>) 2.0 dN-m, alternatively >2.5 dN-m, alternatively >3.0 dN-m (e.g., from 2.5 to 4.0 dN-m). These values are remarkable achievements in just 12 minutes. Depending upon the amount and type of any optional additive, the crosslinkable polyolefin composition itself may have a significant extent of crosslinking as indicated by MH greater than (>) 2.0 dN-m, alternatively >2.5 dN-m, alternatively >3.0 dN-m (e.g., from 2.5 to 4.0 dN-m). In some embodiments the MH value is from 2.1 to 5.4 dN-m, alternatively from 2.7 to 5.1 dN-m, alternatively from 2.8 to 5.1 dN-m, alternatively from 3.1 to 5.1 dN-m, alternatively from 3.7 to 5.1 dN-m.

In some embodiments the crosslinkable polyolefin composition further comprises one or more additives and the type and amount of the one or more optional additives (e.g., constituents (D) and (E)) are such that the crosslinkable polyolefin composition itself may also have a hot creep of less than 175% after being kept at 200° C. for 15 minutes, alternatively a hot creep of <100% after being kept at 200° C. for 15 minutes. In some embodiments the hot creep value is from 23% to 145%, alternatively from 23% to 87%, alternatively from 23% to 82%, alternatively from 24% to 45%, alternatively from 24% to 29%. In some such embodiments, the crosslinkable polyolefin composition itself may also have a significant extent of crosslinking as indicated by MH greater than (>) 2.0 dN-m, alternatively >2.5 dN-m, alternatively >3.0 dN-m (e.g., from 2.5 to 4.0 dN-m). In some embodiments the MH value is from 2.1 to 5.4 dN-m, alternatively from 2.7 to 5.1 dN-m, alternatively from 2.8 to 5.1 dN-m, alternatively from 3.1 to 5.1 dN-m, alternatively from 3.7 to 5.1 dN-m The inventive polyolefin composition containing the polyolefin polymer and the alkenyl-functional monocyclic organosiloxane may be cured (crosslinked) via irradiation or an organic peroxide without ring opening of the alkenyl-functional monocyclic organosiloxane. The curing reaction is conducted in such a way that the alkenyl-functional monocyclic organosiloxane does not give a polymerized siloxane (silicone polymer). Without being bound by theory it is believed that the constituents of the crosslinkable polyolefin composition are chosen such that during curing of the crosslinkable polyolefin composition the alkenyl-functional monocyclic organosiloxane does not ring-open to give a ring-opened silanol (S—OH)-functional organosiloxane oligomer (linear or branched), and therefore the polymerized siloxane (silicone polymer) is not formed in situ within the polyolefin polymer. The alkenyl-functional monocyclic organosiloxane cannot undergo ring-opening at least in part because the crosslinkable polyolefin composition does not contain, and thus because the curing reaction is conducted in the absence of, a ring opening catalyst. The excluded ring-opening catalysts are known and include a phosphazene base. The phosphazene base has a core structure P=N, in which free N valencies are linked to hydrogen, hydrocarbyl, —P=N or =P—N, and free P valencies are linked to =N or —N. Examples of phosphazene bases are found in U.S. Pat. No. 8,426,519 B2, column 9, line 29, to column 10, line 31. Other types of ring opening catalysts, which are excluded from the crosslinkable polyolefin composition and hence from the crosslinked polyolefin product prepared therefrom, are known. For examples, see F. O. Stark et al., Silicones, Comprehensive Organometallic Chemistry, volume 2, 305, Pergamon Press (1982). Examples are strong acids such as trifluoromethanesulfonic acid and its metal salts, sulfuric acid, perchloric acid, and hydrochloric acid;

cationic ring opening catalysts such as metal halides; and anionic ring opening catalysts such as organolithiums, alkali metal oxides, and alkali metal hydroxides. In the absence of the ring opening catalyst, the inventive polyolefin composition undergoes crosslinking of the alkenyl-functional monocyclic organosiloxane to the polyolefin polymer via free-radical curing to form the crosslinked polyolefin product. The inventive crosslinking beneficially occurs without ring opening of the alkenyl-functional monocyclic organosiloxane even in the presence of ambient moisture. Embodiments of the inventive crosslinking avoid the harmful effect(s) of phosphazene base on crosslinking level (extent or degree of crosslinking).

Unpredictably, the inventive polyolefin composition containing the alkenyl-functional monocyclic organosiloxane, or the inventive crosslinked polyolefin product prepared therefrom, has improved hot creep performance after being held at 200° C. for 15 minutes.

The term "ring opening catalyst" as used herein means a substance that initiates a ring opening polymerization reaction, and/or enhances the rate of a ring opening polymerization reaction, of a cyclic siloxane monomer.

The term "ring opening polymerization" as used herein is a type of chain growth polymerization reaction wherein a reactive end of a polymer chain opens the ring of a cyclic monomer to give a longer polymer chain.

The crosslinkable polyolefin composition and its carrier mixture may be made by a number of different ways. In some aspects they may be made by mixing a melt of the (A) polyolefin polymer with the (B) monocyclic organosiloxane of formula (I) and (C) organic peroxide to give the carrier mixture and an embodiment of the crosslinkable polyolefin composition consisting of the carrier mixture. In other aspects they may be made by mixing a melt of the (A) polyolefin polymer with the (B) monocyclic organosiloxane of formula (I) and (C) organic peroxide and any optional constituents (e.g., any zero, one or more of constituents (D) to (M) to give the crosslinkable polyolefin composition as an admixture of constituents (A), (B), (C), and the any optional constituents. In other aspects they may be made by mixing a melt of the (A) polyolefin polymer with the (B) monocyclic organosiloxane of formula (I) to give a premixture, cooling the premixture to a temperature less than 100° C. (e.g., from 20° to 80° C.), and soaking or imbibing the (C) organic peroxide into the premixture to give the carrier mixture and an embodiment of the crosslinkable polyolefin composition consisting of the carrier mixture. The mixing may comprise compounding, kneading, or extruding. To facilitate mixing one or more constituents (e.g., (B), additives (C), (D), (E), and etc.) may be provided in the form of an additive masterbatch in a portion of (A).

In another aspect, the crosslinkable polyolefin composition may be made by contacting the (B) monocyclic organosiloxane of formula (I), the (C) organic peroxide, and optionally zero, one or more of any optional constituents (e.g., (D) anti-scorch agent and/or (E) antioxidant), with an unmelted form of the (A) polyolefin polymer to give the crosslinkable polyolefin composition as an admixture of constituents (A), (B), (C), and the any optional constituents. The contacting may comprise soaking, imbibing or injecting. Constituents (B), (C), and any optional constituent(s) independently may be combined by compounding, extruding, imbibing, injecting, kneading, or soaking. The mixing or contacting may be carried out at a temperature from about 20° to 100° C. for 0.1 to 100 hours, e.g., 60° to 80° C. for 0.1 to 24 hours. Higher temperatures may be used for the mixing or contacting with the proviso that the (C) organic peroxide is not subjected thereto. Thereafter if desired, the admixture may be cooled to a temperature below a peroxide decomposition temperature before being mixed or contacted with (C) organic peroxide. If desired the crosslinkable polyolefin composition may be cooled to a storage temperature (e.g., 23° C.) and stored for a period of time of 1 hour, 1 week, 1 month, or longer.

The crosslinkable polyolefin composition may be prepared as a one-part formulation, alternatively a multi-part formulation such as a two-part formulation, alternatively a three-part formulation. There is no inherent reason why any combination of constituents cannot be included in either part or parts of these formulations.

The (A1) ethylene/alpha-olefin copolymer elastomer having a melt index from 0.6 to 6.2 g/10 min. and a density of from 0.854 to 0.912 g/cm$^3$ may be a single such ethylene/alpha-olefin copolymer elastomer or a blend of any two or more such ethylene/alpha-olefin copolymer elastomers.

The constituent (A1) ethylene/alpha-olefin copolymer elastomer having a melt index from 0.6 to 6.2 g/10 min. and a density of from 0.854 to 0.912 g/cm$^3$ may be an ENGAGE™ ethylene/1-octene copolymer selected from ENGAGE™ 8100 ($I_2$=1 g/10 min., density 0.870 g/cm$^3$), 8107 ($I_2$=1 g/10 min., density 0.870 g/cm$^3$), 8200 ($I_2$=5 g/10 min., density 0.870 g/cm$^3$), 8207 (12=5 g/10 min., density 0.870 g/cm$^3$), 8452 ($I_2$=3 g/10 min., density 0.875 g/cm$^3$), 8003 ($I_2$=1 g/10 min., density 0.885 g/cm$^3$), 8440 ($I_2$=1.6 g/10 min., density 0.897 g/cm$^3$), 8480 ($I_2$=1 g/10 min., density 0.902 g/cm$^3$), 8450 ($I_2$=3 g/10 min., density 0.902 g/cm$^3$), 8540 ($I_2$=1 g/10 min., density 0.908 g/cm$^3$), and 8842 ($I_2$=1 g/10 min., density 0.857 g/cm$^3$), all available from The Dow Chemical Company.

The constituent (A1) ethylene/alpha-olefin copolymer elastomer having a melt index from 0.6 to 6.2 g/10 min. and a density of from 0.854 to 0.912 g/cm$^3$ may be an ENGAGE™ ethylene/1-butene copolymer selected from ENGAGE™ 7487 ($I_2$=1.2 g/10 min., density 0.862 g/cm$^3$), 7457 ($I_2$=3.6 g/10 min., density 0.862 g/cm$^3$), 7447 ($I_2$=5 g/10 min., density 0.865 g/cm$^3$), 7367 ($I_2$=0.8 g/10 min., density 0.874 g/cm$^3$), 7270 ($I_2$=0.8 g/10 min., density 0.880 g/cm$^3$), 7277 (12=0.8 g/10 min., density 0.880 g/cm$^3$), and 7256 ($I_2$=2.5 g/10 min., density 0.885 g/cm$^3$), all available from The Dow Chemical Company.

The (A2) a blend of the (A1) and the LDPE having a melt index of 1.50 to 2.49 g/10 min. wherein the LDPE may be a single such LDPE or a blend of any two or more such LDPEs.

The (A2) a blend of the (A1) and the LDPE having a melt index of 1.50 to 2.49 g/10 min. wherein the LDPE may be an LDPE selected from LDPE-1 ($I_2$ 1.9 g/10 min. and density 0.9183 g/cm$^3$), LDPE-2 ($I_2$ 2.4 g/10 min. and density of 0.920 g/cm$^3$), and LDPE-3 ($I_2$ 1.0 g/10 min. and density 0.920 g/cm$^3$), all available from The Dow Chemical Company.

The (A) polyolefin polymer may be made by any suitable process, many of which are well-known in the art. Any conventional or hereafter discovered production process for producing polyolefin polymers may be employed for preparing the (A). Typically the production process comprises one or more polymerization reactions.

The constituent (B) monocyclic organosiloxane of formula (I): a molecule containing a single ring substructure composed of silicon and oxygen atoms disposed in an alternating arrangement; and unsaturated organo groups; and optionally H, saturated or aromatic substituent groups; wherein there are at least two unsaturated organo groups and each of at least two silicon atoms in the ring substructure have at least one unsaturated organo group bonded thereto and wherein after accounting for the unsaturated organo groups and oxygen atoms any remaining valences of the silicon atoms are bonded to the H, saturated or aromatic substituent groups; or collection of such molecules. Constituent (B) may be a monocyclic organosiloxane composed of a 6-membered ring (n=3), an 8-membered ring (n=4), a 10-membered ring (n=5), or a 12-membered ring (n=6). The ring substructure is composed of units of formula (I): $[R^1,R^2SiO_{2/2}]n$ (1), wherein subscript n, $R^1$ and $R^2$ are as defined earlier. In each $[R^1,R^2SiO_{2/2}]$ unit, its $R^1$ and $R^2$ groups are bonded to its silicon atom. The units may be designated using conventional organosiloxane shorthand notations simply as $D^{R1,R2}$ such that formula (I) becomes $[D^{R1,R2}]_n$. $R^1$ and $R^2$ may be the same, alternatively different.

In some aspects of the (B) monocyclic organosiloxane of formula (I) $R^1$ is vinyl and $R^2$ is ethyl and (B) is $D^{Vi,Et}$ wherein Vi is vinyl and Et is ethyl; alternatively $R^1$ is allyl and $R^2$ is ethyl and (B) is $D^{Allyl,Et}$; alternatively $R^1$ is butenyl ($H_2C\!=\!C(H)CH_2CH_2\!-\!$) and $R^2$ is ethyl and (B) is $D^{Butenyl,Et}$. In some aspects $R^1$ is vinyl and $R^2$ is vinyl and (B) is $D^{Vi,Vi}$; alternatively $R^1$ is allyl and $R^2$ is allyl and (B) is $D^{Allyl,Allyl}$; alternatively $R^1$ is butenyl ($H_2C\!=\!C(H)CH_2CH_2\!-\!$) and $R^2$ is butenyl and (B) is $D^{Butenyl,Butenyl}$. In some aspects $R^1$ is vinyl and $R^2$ is phenyl and (B) is $D^{Vi,Ph}$ wherein Ph is phenyl; alternatively $R^1$ is allyl and $R^2$ is phenyl and (B) is $D^{Allyl,Ph}$; alternatively $R^1$ is butenyl ($H_2C\!=\!C(H)CH_2CH_2\!-\!$) and $R^2$ is phenyl and (B) is $D^{Butenyl,Ph}$. When $R^2$ is methyl ($CH_3$), the unit may be designated more simply as $D^{R1}$ such that formula (I) becomes $[D^{R1}]_n$. In some aspects $R^1$ is vinyl and $R^2$ is methyl and (B) is $D^{Vi}$; alternatively $R^1$ is allyl and $R^2$ is methyl and (B) is $D^{Allyl}$; alternatively $R^1$ is butenyl ($H_2C\!=\!C(H)CH_2CH_2\!-\!$) and $R^2$ is methyl and (B) is $D^{Butenyl}$. In some embodiments, (B) is 2,4,6-trimethyl-2,4,6-trivinyl-cyclotrisiloxane, "$(D^{Vi})_3$" (CAS No. 3901-77-7); 2,4,6,8-tetramethyl-2,4,6,8-tetravinyl-cyclotetrasiloxane, "$(D^{Vi})_4$" (CAS No. 2554-06-5); or a combination thereof.

In some aspects of the (B) monocyclic organosiloxane of formula (I) each $R^1$ is independently $H_2C\!=\!C(R^{1a})\!-\!C(\!=\!O)\!-\!O\!-\!(CH_2)_m\!-\!$ wherein $R^{1a}$ and subscript m are as defined earlier. In some aspects $R^{1a}$ is H, alternatively $R^{1a}$ is methyl. In some aspects subscript m is 1, 2, or 3; alternatively m is 2, 3, or 4; alternatively m is 2 or 3; alternatively m is 1; alternatively m is 2; alternatively m is 3; alternatively m is 4. In some aspects each $R^2$ is independently ($C_1$-$C_2$) alkyl or ($C_2$-$C_3$)alkenyl; alternatively each $R^2$ is independently ($C_1$-$C_2$)alkyl; alternatively each $R^2$ is independently methyl.

The amount of the constituent (B) monocyclic organosiloxane of formula (I) in the crosslinkable polyolefin composition may be from 0.41 to 1.91 wt %, alternatively from 0.8 to 1.6 wt %, alternatively from 1.0 to 1.4 wt %, alternatively from 1.15 to 1.24 wt %; all based on weight of the carrier mixture, alternatively the crosslinkable polyolefin composition.

The amount of the constituent (B) monocyclic organosiloxane of formula (I) in the crosslinkable polyolefin composition may be higher in embodiments of the crosslinkable polyolefin composition that contain (F) filler than in embodiments of the crosslinkable polyolefin composition that are free of (F) filler.

Regarding determining the amount of the constituent (B), the presence of crosslinking may be detected by an increase in torque using a moving die rheometer (MDR). In some aspects the presence of crosslinking may be detected as a percentage solvent extraction (Ext %). Ext %=W1/Wo*100%, wherein W1 is the weight after extraction, Wo is original weight before extraction, / indicates division, and * indicates multiplication. The absence of, or a reduced level of, the carbon-carbon double bond of the unsaturated organo group (e.g., $R^1$) of (B) in the crosslinked polyolefin product (due to a coupling with the (A) polyolefin polymer) may be detected by carbon-13 or silicon-29 nuclear magnetic resonance ($^{13}$C-NMR spectroscopy and/or $^{29}$Si-NMR) spectroscopy.

The constituent (C) organic peroxide: a molecule containing carbon atoms, hydrogen atoms, and two or more oxygen atoms, and having at least one —O—O— group, with the proviso that when there are more than one —O—O— group, each —O—O— group is bonded indirectly to another —O—O— group via one or more carbon atoms, or collection of such molecules. The (C) organic peroxide may be added to the crosslinkable polyolefin composition for curing comprising heating the crosslinkable polyolefin composition comprising constituents (A), (B), and (C) to a temperature at or above the (C) organic peroxide's decomposition temperature. The (C) organic peroxide may be a monoperoxide of formula $R^O\!-\!O\!-\!O\!-\!R^O$, wherein each $R^O$ independently is a ($C_1$-$C_{20}$)alkyl group or ($C_6$-$C_{20}$)aryl group. Each ($C_1$-$C_{20}$)alkyl group independently is unsubstituted or substituted with 1 or 2 ($C_6$-$C_{12}$)aryl groups. Each ($C_6$-$C_{20}$)aryl group is unsubstituted or substituted with 1 to 4 ($C_1$-$C_{10}$)alkyl groups. Alternatively, the (C) may be a diperoxide of formula $R^O\!-\!O\!-\!O\!-\!R\!-\!O\!-\!O\!-\!R^O$, wherein R is a divalent hydrocarbon group such as a ($C_2$-$C_{10}$)alkylene, ($C_3$-$C_{10}$)cycloalkylene, or phenylene, and each $R^O$ is as defined above. The (C) organic peroxide may be bis(1,1-dimethylethyl) peroxide; bis(1,1-dimethylpropyl) peroxide; 2,5-dimethyl-2,5-bis(1,1-dimethylethylperoxy) hexane; 2,5-dimethyl-2,5-bis(1,1-dimethylethylperoxy) hexyne; 4,4-bis(1,1-dimethylethylperoxy) valeric acid; butyl ester; 1,1-bis(1,1-dimethylethylperoxy)-3,3,5-trimethylcyclohexane; benzoyl peroxide; tert-butyl peroxybenzoate; di-tert-amyl peroxide ("DTAP"); bis(alpha-t-butyl-peroxyisopropyl) benzene ("BIPB"); isopropylcumyl t-butyl peroxide; t-butylcumylperoxide; di-t-butyl peroxide; 2,5-bis(t-butylperoxy)-2,5-dimethylhexane; 2,5-bis(t-butylperoxy)-2,5-dimethylhexyne-3,1,1-bis(t-butylperoxy)-3,3,5-trimethylcyclohexane; isopropylcumyl cumylperoxide; butyl 4,4-di(tert-butylperoxy) valerate; or di(isopropylcumyl) peroxide; or dicumyl peroxide. The (C) organic peroxide may be dicumyl peroxide. In some aspects only a blend of two or more (C) organic peroxides is used, e.g., a 20:80 (wt/wt) blend of t-butyl cumyl peroxide and bis(t-butyl peroxy isopropyl)benzene (e.g., LUPEROX D446B, which is commercially available from Arkema). In some aspects at least one, alternatively each (C) organic peroxide contains one —O—O— group. The (C) organic peroxide may be 0.29 to 0.44 wt %, alternatively 0.30 to 39 wt %, alternatively 0.30 to 0.37 wt % of the carrier mixture, alternatively of the crosslinkable polyolefin composition.

The optional constituent (D) scorch retardant: a molecule that inhibits premature curing, or a collection of such molecules. Examples of a scorch retardant are hindered phenols; semi-hindered phenols; TEMPO; TEMPO derivatives; 1,1-diphenylethylene; 2,4-diphenyl-4-methyl-1-pentene (also known as alpha-methyl styrene dimer or AMSD); and allyl-containing compounds described in U.S. Pat. No. 6,277,925B1, column 2, line 62, to column 3, line 46. In some aspects the crosslinkable polyolefin composition and crosslinked polyolefin product is free of (D). When present, the (D) scorch retardant may be from 0.01 to 1.5 wt %, alternatively 0.05 to 1.2 wt %, alternatively 0.1 to 1.0 wt % of the crosslinkable polyolefin composition.

The optional constituent (E) antioxidant: an organic molecule that inhibits oxidation, or a collection of such molecules. The (E) antioxidant functions to provide antioxidizing properties to the crosslinkable polyolefin composition and/or crosslinked polyolefin product. Examples of suitable (E) are bis(4-(1-methyl-1-phenylethyl)phenyl)amine (e.g., NAUGARD 445); 2,2'-methylene-bis(4-methyl-6-t-butylphenol) (e.g., VANOX MBPC); 2,2'-thiobis(2-t-butyl-5-methylphenol (CAS No. 90-66-4; 4,4'-thiobis(2-t-butyl-5-methylphenol) (also known as 4,4'-thiobis(6-tert-butyl-m-cresol), CAS No. 96-69-5, commercially LOWINOX TBM-6); 2,2'-thiobis(6-t-butyl-4-methylphenol (CAS No. 90-66-4, commercially LOWINOX TBP-6); tris[(4-tert-butyl-3-hydroxy-2,6-dimethylphenyl)methyl]-1,3,5-triazine-2,4,6-trione (e.g., CYANOX 1790); pentaerythritol tetrakis(3-(3,5-bis(1,1-dimethylethyl)-4-hydroxyphenyl)propionate (e.g., IRGANOX 1010, CAS Number 6683-19-8); 3,5-bis(1,1-dimethylethyl)-4-hydroxybenzenepropanoic acid 2,2'-thiodiethanediyl ester (e.g., IRGANOX 1035, CAS Number 41484-35-9); distearyl thiodipropionate ("DSTDP"); dilauryl thiodipropionate (e.g., IRGANOX PS 800); stearyl 3-(3,5-di-t-butyl-4-hydroxyphenyl)propionate (e.g., IRGANOX 1076); 2,4-bis(dodecylthiomethyl)-6-methylphenol (IRGANOX 1726); 4,6-bis(octylthiomethyl)-o-cresol (e.g. IRGANOX 1520); and 2',3-bis[[3-[3,5-di-tert-butyl-4-hydroxyphenyl]propionyl]] propionohydrazide (IRGANOX 1024). In some aspects (E) is 4,4 thiobis(2-t-butyl-5-methylphenol) (also known as 4,4'-thiobis(6-tert-butyl-m-cresol); 2,2'-thiobis(6-t-butyl-4-methylphenol; tris[(4-tert-butyl-3-hydroxy-2,6-dimethylphenyl)methyl]-1,3,5-triazine-2,4,6-trione; distearyl thiodipropionate; or dilauryl thiodipropionate; or a combination of any two or more thereof. The combination may be tris[(4-tert-butyl-3-hydroxy-2,6-dimethylphenyl)methyl]-1,3,5-triazine-2,4,6-trione and distearyl thiodipropionate. In some aspects the crosslinkable polyolefin composition and crosslinked polyolefin product is free of (E). When present, the (E) antioxidant may be from 0.01 to 1.5 wt %, alternatively 0.05 to 1.2 wt %, alternatively 0.1 to 1.0 wt % of the crosslinkable polyolefin composition.

The optional constituent (F) filler: a finely-divided particulate solid or gel that occupies space in, and optionally affects function of, a host material. The (F) filler may be a calcined clay, an organoclays, or a hydrophobized fumed silica such as those commercially available under the CAB-O-SIL trade name from Cabot Corporation. The (F) filler may have flame retarding effects. In some aspects the crosslinkable polyolefin composition and crosslinked polyolefin product is free of (F). When present, the (F) filler may be 1 to 40 wt %, alternatively 2 to 30 wt %, alternatively 5 to 20 wt % of the crosslinkable polyolefin composition.

In regard to (F) filler, in some aspects the crosslinkable polyolefin composition does not contain 20 wt % or more of, alternatively does not contain 15 wt % or more of, alternatively does not contain 10 wt % or more of, alternatively is free of an inorganic filler selected from the group consisting of aluminum oxide, aluminum silicate, calcium silicate, magnesium silicate, silica, titanium dioxide, and mixtures thereof. In some aspects the crosslinkable polyolefin composition does not contain 20 wt % or more of, alternatively does not contain 15 wt % or more of, alternatively does not contain 10 wt % or more of, alternatively is free of any inorganic filler selected from the group consisting of: solids containing Al, solids containing Ca, solids containing Mg, solids containing Si, solids containing Ti, and mixtures thereof. In some aspects the crosslinkable polyolefin composition is free of a silsesquioxane, alternatively any siloxane except constituent (B). In some aspects the crosslinkable polyolefin composition is free of a silsesquioxane and any one of the above-mentioned groups of inorganic fillers. For avoidance of doubt, the term "inorganic filler" does not include carbon black.

The optional constituent (G) flame retardant: a molecule or substance that inhibits combustion, or a collection of such molecules. The (G) may be a halogenated or halogen-free compound. Examples of (G) halogenated (G) flame retardants are organochlorides and organobromides, Examples of the organochlorides are chlorendic acid derivatives and chlorinated paraffins. Examples of the organobromides are decabromodiphenyl ether, decabromodiphenyl ethane, polymeric brominated compounds such as brominated polystyrenes, brominated carbonate oligomers, brominated epoxy oligomers, tetrabromophthalic anhydride, tetrabromobisphenol A and hexabromocyclododecane. Typically, the halogenated (G) flame retardants are used in conjunction with a synergist to enhance their efficiency. The synergist may be antimony trioxide. Examples of the halogen-free (G) flame retardant are inorganic minerals, organic nitrogen intumescent compounds, and phosphorus based intumescent compounds. Examples of the inorganic minerals are aluminum hydroxide and magnesium hydroxide. Examples of the phosphorous-based intumescent compounds are organic phosphonic acids, phosphonates, phosphinates, phosphonites, phosphinites, phosphine oxides, phosphines, phosphites, phosphates, phosphonitrilic chloride, phosphorus ester amides, phosphoric acid amides, phosphonic acid amides, phosphinic acid amides, melamine and melamine derivatives thereof, including melamine polyphosphate, melamine pyrophosphate and melamine cyanurate, and mixtures of two or more of these materials. Examples include phenylbisdodecyl phosphate, phenylbisneopentyl phosphate, phenyl ethylene hydrogen phosphate, phenyl-bis-3,5,5' trimethylhexyl phosphate), ethyldiphenyl phosphate, 2 ethylhexyl di(p-tolyl) phosphate, diphenyl hydrogen phosphate, bis(2-ethyl-hexyl) para-tolylphosphate, tritolyl phosphate, bis(2-ethylhexyl)-phenyl phosphate, tri(nonylphenyl) phosphate, phenylmethyl hydrogen phosphate, di(dodecyl) p-tolyl phosphate, tricresyl phosphate, triphenyl phosphate, triphenyl phosphate, dibutylphenyl phosphate, 2-chloroethyldiphenyl phosphate, p-tolyl bis(2,5,5'-trimethylhexyl) phosphate, 2-ethylhexyldiphenyl phosphate, and diphenyl hydrogen phosphate. Phosphoric acid esters of the type described in U.S. Pat. No. 6,404,971 are examples of phosphorus-based flame retardants. Additional examples include liquid phosphates such as bisphenol A diphosphate (BAPP) (Adeka Palmarole) and/or resorcinol bis(diphenyl phosphate) (Fyroflex RDP) (Supresta, ICI), solid phosphorus such as ammonium polyphosphate (APP), piperazine pyrophosphate and piperazine polyphosphate. Ammonium polyphosphate is often used with flame retardant co-additives, such as melamine derivatives. Also useful is Melafine (DSM) (2,4,6-triamino-1,3,5-triazine; fine grind melamine). In some aspects the crosslinkable polyolefin composition and crosslinked polyolefin product is free of (G). When present, the (G) may be in a concentration of from 0.01 to 70 wt %, alternatively 0.05 to 40 wt %, alternatively 1 to 20 wt % of the crosslinkable polyolefin composition.

The optional constituent (H) hindered amine stabilizer: a molecule that contains a basic nitrogen atom that is bonded to at least one sterically bulky organo group and functions as an inhibitor of degradation or decomposition, or a collection of such molecules. The (H) is a compound that has a sterically hindered amino functional group and inhibits oxidative degradation and can also increase the shelf lives of embodiments of the crosslinkable polyolefin composition that contain (C) organic peroxide. Examples of suitable (H) are butanedioic acid dimethyl ester, polymer with 4-hydroxy-2,2,6,6-tetramethyl-1-piperidine-ethanol (CAS No. 65447-77-0, commercially LOWILITE 62); and N,N'-bis-formyl-N,N'-bis(2,2,6,6-tetramethyl-4-piperidinyl)-hexamethylenediamine (CAS No. 124172-53-8, commercially Uvinul 4050 H). In some aspects the crosslinkable polyolefin composition and crosslinked polyolefin product is free of (H). When present, the (H) hindered amine stabilizer may be from 0.001 to 1.5 wt %, alternatively 0.002 to 1.2 wt %, alternatively 0.002 to 1.0 wt %, alternatively 0.005 to 0.5 wt %, alternatively 0.01 to 0.2 wt %, alternatively 0.05 to 0.1 wt % of the crosslinkable polyolefin composition.

The optional constituent (I) tree retardant: a molecule that inhibits water and/or electrical treeing, or a collection of such molecules. The tree retardant may be a water tree retardant or electrical tree retardant. The water tree retardant is a compound that inhibits water treeing, which is a process by which polyolefins degrade when exposed to the combined effects of an electric field and humidity or moisture. The electrical tree retardant, also called a voltage stabilizer, is a compound that inhibits electrical treeing, which is an electrical pre-breakdown process in solid electrical insulation due to partial electrical discharges. Electrical treeing can occur in the absence of water. Water treeing and electrical treeing are problems for electrical cables that contain a coated conductor wherein the coating contains a polyolefin. The (I) may be a poly(ethylene glycol) (PEG). In some aspects the crosslinkable polyolefin composition and crosslinked polyolefin product is free of (I). When present, the (I) tree retardant may be from 0.01 to 1.5 wt %, alternatively 0.05 to 1.2 wt %, alternatively 0.1 to 1.0 wt % of the crosslinkable polyolefin composition.

The optional constituent (J) methyl radical scavenger: a molecule that is reactive with methyl radicals, or a collection of such molecules. The (J) react with methyl radicals in the crosslinkable polyolefin composition or crosslinked polyolefin product. The (J) may be a "TEMPO" derivative of 2,2,6,6-tetramethyl-1-piperidinyl-N-oxyl or a 1,1-diarylethylene. Examples of TEMPO derivatives are 4-acryloxy-2,2,6,6-tetramethyl-1-piperidinyl-N-oxyl (CAS No. 21270-85-9, "acrylate TEMPO"), 4-allyloxy-2,2,6,6-tetramethyl-1-piperidinyl-N-oxyl (CAS No. 217496-13-4, "allyl TEMPO"); bis(2,2,6,6-tetramethyl-1-piperidinyl-N-oxyl) sebacate (CAS No. 2516-92-9, "bis TEMPO")); N,N-bis (acryloyl-4-amino)-2,2,6,6-tetramethyl-1-piperidinyl-N-oxyl (CAS No. 1692896-32-4, "diacrylamide TEMPO"); and N-acryloyl-4-amino-2,2,6,6-tetramethyl-1-piperidinyl-N-oxyl (CAS No. 21270-88-2, "monoacrylamide TEMPO"). Examples of 1,1-diarylethylenes are 1,1-diphenylethylene and alpha-methylstyrene. In some aspects the crosslinkable polyolefin composition and crosslinked polyolefin product is free of (J). When present, the (J) methyl radical scavenger may be from 0.01 to 1.5 wt %, alternatively 0.05 to 1.2 wt %, alternatively 0.1 to 1.0 wt % of the crosslinkable polyolefin composition.

The optional constituent (K) conventional coagent: a molecule that contains a backbone or ring substructure and one, alternatively two or more propenyl, acrylate, and/or vinyl groups bonded thereto, wherein the substructure is composed of carbon atoms and optionally nitrogen atoms, or a collection of such molecules. The (K) conventional coagent is free of silicon atoms. The (K) conventional coagent may be a propenyl-functional conventional coagent as described by any one of limitations (i) to (v): (i) (K) is 2-allylphenyl allyl ether; 4-isopropenyl-2,6-dimethylphenyl allyl ether; 2,6-dimethyl-4-allylphenyl allyl ether; 2-methoxy-4-allylphenyl allyl ether; 2,2'-diallyl bisphenol A; O,O'-diallyl bisphenol A; or tetramethyl diallylbisphenol A; (ii) (K) is 2,4-diphenyl-4-methyl-1-pentene or 1,3-diisopropenylbenzene; (iii) (K) is triallyl isocyanurate ("TAIC"); triallyl cyanurate ("TAC"); triallyl trimellitate ("TATM"); N,N,N',N',N'',N''-hexaallyl-1,3,5-triazine-2,4,6-triamine ("HATATA"; also known as $N^2,N^2,N^4,N^4,N^6,N^6$-hexaallyl-1,3,5-triazine-2,4,6-triamine); triallyl orthoformate; pentaerythritol triallyl ether; triallyl citrate; or triallyl aconitate; (iv) (K) is a mixture of any two of the propenyl-functional coagents in (i). Alternatively, the (K) may be an acrylate-functional conventional coagent selected from trimethylolpropane triacrylate ("TMPTA"), trimethylolpropane trimethylacrylate ("TMPTMA"), ethoxylated bisphenol A dimethacrylate, 1,6-hexanediol diacrylate, pentaerythritol tetraacrylate, dipentaerythritol pentaacrylate, tris(2-hydroxyethyl) isocyanurate triacrylate, and propoxylated glyceryl triacrylate. Alternatively, the (K) may be a vinyl-functional conventional coagent selected from polybutadiene having at least 50 wt % 1,2-vinyl content and trivinyl cyclohexane ("TVCH"). Alternatively, the (K) may be a conventional coagent described in U.S. Pat. Nos. 5,346,961 or 4,018,852. Alternatively, the (K) may be a combination or any two or more of the foregoing conventional coagents. In some aspects the crosslinkable polyolefin composition and crosslinked polyolefin product is free of (K). When present, the (K) conventional coagent may be 0.01 to 4.5 wt %, alternatively 0.05 to 2 wt %, alternatively 0.1 to 1 wt %, alternatively 0.2 to 0.5 wt % of the crosslinkable polyolefin composition.

The optional constituent (L) nucleating agent: an organic or inorganic additive that that enhances the rate of crystallization of a polyolefin polymer. Examples of (L) are calcium carbonate, titanium dioxide, barium sulfate, ultra-high-molecular-weight polyethylene, potassium hydrogen phthalate, benzoic acid compounds, sodium benzoate compounds, disodium bicyclo[2.2.1]heptane-2,3-dicarboxylate, zinc monoglycerolate, and 1,2-cyclohexanedicarboxylic acid, calcium salt:zinc stearate. In some aspects the crosslinkable polyolefin composition and crosslinked polyolefin product is free of (L). When present, the (L) may be in a concentration of from 0.01 to 1.5 wt %, alternatively 0.05 to 1.2 wt %, alternatively 0.1 to 1.0 wt % of the crosslinkable polyolefin composition.

The optional constituent (M) carbon black: a finely-divided form of paracrystalline carbon having a high surface area-to-volume ratio, but lower than that of activated carbon. Examples of (M) are furnace carbon black, acetylene carbon black, conductive carbons (e.g., carbon fibers, carbon nanotubes, graphene, graphite, and expanded graphite platelets). In some aspects the crosslinkable polyolefin composition and crosslinked polyolefin product is free of (M). When present, the (M) may be in a concentration of from 0.01 to 40 wt %, alternatively 0.05 to 35 wt %, alternatively 0.1 to 20 wt %, alternatively 0.5 to 10 wt %, alternatively 1 to 5 wt %, of the crosslinkable polyolefin composition.

In addition the crosslinkable polyolefin composition may independently further comprise one or more other optional additives selected from a carrier resin, lubricant, processing aid, slip agent, plasticizer, surfactant, extender oil, acid scavenger, and metal deactivator.

The foregoing constituents of the crosslinkable polyolefin composition are not believed to function as ring opening catalysts for cyclic siloxanes therein. If, however, any one or more of the foregoing constituents of the crosslinkable polyolefin composition should unexpectedly be found to function as ring opening catalyst(s) for cyclic siloxanes, such constituent(s) would be excluded from the crosslinkable polyolefin composition.

The crosslinked polyolefin product: a reaction product that contains networked polyolefinic resins that contain C—C bond crosslinks formed during curing (crosslinking) of the crosslinkable polyolefin composition. The networked polyolefinic resins may comprise reaction products of coupling macromolecules of the (A) polyolefin polymer with molecules of the (B) monocyclic organosiloxane of formula (I) to give a network structure containing a multivalent monocyclic organosiloxane crosslinker group that is bonded to two or more macromolecules from the (A) polyolefin polymer via a reaction of the two or more macromolecules of (A) polyolefin polymer with one or more $R^1$ groups of the molecule of (B) monocyclic organosiloxane of formula (I). In some aspects two macromolecules of (A) may be added across the same carbon-carbon double bond of the one $R^1$. For example, when two or more $R^1$ is vinyl and zero, one or more $R^2$ is vinyl, the network structure of the crosslinked polyolefin product may contain two or more multivalent monocyclic organosiloxane crosslinker groups of formula (II): $[—CH_2CH_2(R^2)SiO_{2/2}]$ (II) and/or formula (III) $[CH_3C(-)(H),(R^2)SiO_{2/2}]$ (III) and n-2 or fewer (e.g., n-3) unreacted units, if any, of formula (I), wherein subscript n is as defined for formula (I) and each "-" indicates one valency of a multivalent group. When each $R^2$ is independently H, $(C_1-C_4)$alkyl, or phenyl in formula (I), each $R^2$ in formulas (II) and (III) independently is H, $(C_1-C_4)$alkyl, or phenyl.

The crosslinked polyolefin product may also contain by-products of curing such as alcohol and ketone by-products of the reaction of the (C) organic peroxide. When the crosslinkable polyolefin composition further contains one or more of any optional additives or constituents such as (E) antioxidant, the crosslinked polyolefin product may also contain the any one or more of the optional additives or constituents such as (E), or one or more reaction products formed therefrom during the curing of the crosslinkable polyolefin composition. The crosslinked polyolefin product may be in a divided solid form or in continuous form. The divided solid form may comprise granules, pellets, powder, or a combination of any two or more thereof. The continuous form may be a molded part (e.g., injection molded part) or an extruded part (e.g., a coated conductor or a cable).

The crosslinked polyolefin product may be free of a ring opening catalyst and/or of siloxane polymer molecules (silicones, prepared by ring-opening polymerization of (B)).

The coated conductor. The coated conductor may be an insulated electrical conductor. The insulated electrical conductor may be a coated metal wire or an electrical cable, including a power cable for use in low voltage ("LV", >0 to <5 kilovolts (kV)), medium voltage ("MV", 5 to <69 kV), high voltage ("HV", 69 to 230 kV) or extra-high voltage ("EHV", >230 kV) data transmitting and electricity-transmitting/distributing applications. A "wire" means a single strand or filament of conductive material, e.g., conductive metal such as copper or aluminum. A "cable" and "power cable" are synonymous and mean an insulated electrical conductor comprising at least one wire disposed within a covering that may be referred to as a sheath, jacket (protective outer jacket), or coating. The insulated electrical conductor may be designed and constructed for use in medium, high, or extra-high voltage applications. Examples of suitable cable designs are shown in U.S. Pat. Nos. 5,246,783; 6,496,629; and 6,714,707.

The insulated electrical conductor may contain a conductor/transmitter core and an outer single layer covering or an outer multilayer covering disposed therearound so as to protect and insulate the conductor/transmitter core from external environments. The conductor/transmitter core may be composed of one or more metal wires. When the conductor/transmitter core contains two or more metal wires, the metal wires may be sub-divided into discrete wire bundles. Each wire in the conductor/transmitter core, whether bundled or not, may be individually coated with an insulation layer and/or the discrete bundles may be coated with an insulation layer. The single layer covering or multilayer covering (e.g., a single layer or multilayer coating or sheath) primarily functions to protect or insulate the conductor/transmitter core from external environments such as sunlight, water, heat, oxygen, other conductive materials (e.g., to prevent short-circuiting), and/or other corrosive materials (e.g., chemical fumes).

The single layer or multilayer covering from one insulated electrical conductor to the next may be configured differently depending upon their respective intended uses. For example, viewed in cross-section, the multilayer covering of the insulated electrical conductor may be configured sequentially from its innermost layer to its outermost layer with the following components: an inner semiconducting layer, a crosslinked polyolefin insulation layer comprising the crosslinked polyolefin product (inventive crosslinked product), an outer semiconducting layer, a metal shield, and a protective sheath. The layers and sheath are circumferentially and coaxially (longitudinally) continuous. The metal shield (ground) is coaxially continuous, and circumferentially either continuous (a layer) or discontinuous (tape or wire). Depending on the intended application the multilayer covering for the insulated optical fiber may omit the semiconducting layers and/or the metal shield. The outer semiconducting layer, when present, may be composed of a peroxide-crosslinked semiconducting product that is either bonded or strippable from the crosslinked polyolefin layer.

In some aspects is a method of making the coated conductor, the method comprising extruding a coating comprising a layer of the crosslinkable polyolefin composition onto a conductor/transmitter core to give a coated core, and passing coated core through a continuous vulcanization (CV) apparatus configured with suitable CV conditions for curing the crosslinkable polyolefin composition to give the coated conductor. CV conditions include temperature, atmosphere (e.g., nitrogen gas), and line speed or passage time period through the CV apparatus. Suitable CV conditions may give a coated conductor exiting the CV apparatus, wherein the coated conductor contains a crosslinked polyolefin layer formed by curing the layer of the crosslinked polyolefin layer.

The method of conducting electricity. The inventive method of conducting electricity may use the inventive coated conductor that comprises the insulated electrical conductor embodiment. Also contemplated is a method of transmitting data using the inventive coated conductor that comprises the insulated electrical conductor.

Density is measured according to ASTM D792-13, *Standard Test Methods for Density and Specific Gravity (Relative Density) of Plastics by Displacement*, Method B (for testing solid plastics in liquids other than water, e.g., in liquid 2-propanol). Report results in units of grams per cubic centimeter (g/cm$^3$ or g/cc).

Hot Creep (Hot Set) Test Method: A test sample (dog-bone-shaped of specified dimensions in ASTM 638-34; thickness<2 millimeter (mm); marker lines 20 mm apart) is placed in an oven at 200° C., and to the test sample is attached a weight equal to a force of 20 Newtons per square centimeter (N/cm$^2$). Elongation of the test sample (distance between marker lines) under these conditions is then measured, and expressed as a percentage of the initial 20 mm distance. If the distance between marker lines widens to 40 mm, the hot creep is 100% (100*(40−20)/20)=100%), to 100 mm, the hot creep is 400%. All other things being equal, the lower the level of crosslinking in the test sample, the greater the extent of elongation thereof. Conversely, the higher the level of crosslinking in the test sample, the lesser the extent of elongation thereof. If the level of crosslinking in the test sample is low enough, the test sample can fail by breaking, which may occur within a few minutes or even seconds of start of the testing. If the test sample is intact after 15 minutes, the weight is removed, the test sample is removed from the oven and allowed to cool to room temperature. Residual elongation of the test sample after cooling is measured.

Melt index ($I_2$) is measured according to ASTM D1238-04 (190° C., 2.16 kg), *Standard Test Method for Melt Flow Rates of Thermoplastics by Extrusion Platometer*, using conditions of 190° C./2.16 kilograms (kg), formerly known as "Condition E" and also known as $I_2$. Report results in units of grams eluted per 10 minutes (g/10 min.) or the equivalent in decigrams per 1.0 minute (dg/1 min.). 10.0 dg=1.00 g.

Moving Die Rheometer (MDR) Test Method: ASTM D5289-12, *Standard Test Method for Rubber Property—Vulcanization Using Rotorless Cure Meters*. Measure torque of a test sample using the following procedure. Heat test sample in a moving die rheometer (MDR) instrument MDR2000 (Alpha Technologies) at 182° C. for 12 minutes while monitoring change in torque for oscillatory deformation of 0.5 degree arc at 100 cpm. Designate the lowest measured torque value as "ML", expressed in deciNewton-meter (dN-m). As curing or crosslinking progresses, the measured torque value increases, eventually reaching a maximum torque value. At 12 minutes, designate the maximum or highest measured torque value as "MH", expressed in dN-m. All other things being equal, the greater the MH torque value, the greater the extent of crosslinking.

The following data are predictive of how the inventive crosslinkable polyolefin compositions and inventive crosslinked polyolefin products would perform when extruded and crosslinked (e.g., in a CV apparatus) to form an insulation layer of a cable.

EXAMPLES (A1)-1 ethylene/1-octene copolymer elastomer having a melt index of 1 g/10 min. and density 0.870 g/cm$^3$.

(A1)-2 ethylene/1-octene copolymer elastomer having a melt index of 5 g/10 min. and density 0.870 g/cm$^3$.

LDPE-1: LDPE having a melt index of 1.9 g/10 min. and density 0.9183 g/cm$^3$.

Monocyclic organosiloxane (B1): 2,4,6,8-tetramethyl-2,4,6,8-tetravinyl-cyclotetrasiloxane, "$(D^{Vi})_4$" (CAS No. 2554-06-5) obtained from The Dow Chemical Company.

Organic peroxide (C1): dicumyl peroxide ("DCP") obtained from Fangruida.

Anti-scorch agent (D1): alpha-methyl styrene dimer (AMSD).

Antioxidant (E1): 4,6-bis(octylthiomethyl)-2-methyl-pheno.

Inventive Examples 1 to 6 (IE1 to IE6): In separate runs, soak monocyclic organosiloxane (B1), organic peroxide (C1), anti-scorch agent (D1), and antioxidant (E1) into pellets of ethylene/1-octene copolymer elastomer (A1)-1 or (A1)-2 or into blend of ethylene/1-octene copolymer elastomer (A1)-1 and LDPE-1 at 80° C. for 6 hours in an oven to give inventive compositions IE1 to IE6 in pellets form. Compositions and hot creep performance are shown in Tables 1 and 2, respectively.

Comparative Examples 1 to 5 (CE1 to CE5): In separate runs, soak monocyclic organosiloxane (B1), organic peroxide (C1), anti-scorch agent (D1), and antioxidant (E1) into pellets of ethylene/1-octene copolymer elastomer (A1)-1 or (A1)-2 and/or LDPE-1 at 80° C. for 6 hours in an oven to give comparative compositions CE1 to CE6 in pellets form. Compositions and hot creep performance are shown in Tables 3 and 4, respectively.

TABLE 1 compositions of IE1 to IE6. (0 = 0.00)

| Constituent (weight parts) | IE1 | IE2 | IE3 | IE4 | IE5 | IE6 |
| --- | --- | --- | --- | --- | --- | --- |
| Ethylene/1-octene Elastomer (A1)-1 | 98.29 | 98.23 | 0 | 24.56 | 49.12 | 73.67 |
| Ethylene/1-octene Elastomer (A1)-2 | 0 | 0 | 98.23 | 0 | 0 | 0 |
| LDPE-1 | 0 | 0 | 0 | 73.67 | 49.12 | 24.56 |
| (B1) = $(D^{Vi})_4$ | 1.20 | 1.20 | 1.20 | 1.20 | 1.20 | 1.20 |
| Dicumyl Peroxide (C1) | 0.30 | 0.36 | 0.36 | 0.36 | 0.36 | 0.36 |
| AMSD (D1) | 0.06 | 0.06 | 0.06 | 0.06 | 0.06 | 0.06 |
| Antioxidant (E1) | 0.15 | 0.15 | 0.15 | 0.15 | 0.15 | 0.15 |
| Total | 100 | 100 | 100 | 100 | 100 | 100 |

The data in Table 1 indicates that the crosslinkable polyolefin compositions of IE1 to IE6 are examples of the inventive crosslinkable polyolefin composition.

TABLE 2

Hot Creep characterizations of IE1 to IE6.

| Constituent (weight parts) | IE1 | IE2 | IE3 | IE4 | IE5 | IE6 |
| --- | --- | --- | --- | --- | --- | --- |
| MDR MH at 182° C. for 12 min. (dN-m) | 3.2 | 5.0 | 2.8 | 2.1 | 2.7 | 3.8 |
| Hot Creep at 200° C. for 15 minutes (%) | 24 | 26 | 86 | 144 | 81 | 44 |

As indicated by the data in Table 2, all inventive crosslinkable polyolefin compositions of E1 to IE6 had hotcreep at 200° C. after being held for 15 minutes of less than the 175% maximum specification. Remarkably, five out of six inventive crosslinkable polyolefin compositions (i.e., E1 to IE3, IE5, and IE6) had hot creep values less than 100%.

The MDR MH data in Table 2 indicates that after being held at 182° C. in a moving die rheometer for 12 minutes, all inventive crosslinkable polyolefin compositions made crosslinked polyolefin products having significant extents of crosslinking as indicated by MH greater than (>) 2.0 dN-m, alternatively >2.5 dN-m, alternatively >3.0 dN-m. These values are remarkable achievements in just 12 minutes.

TABLE 3 compositions of CE1 to CE5. (0 = 0.00)

| Constituent (weight parts) | CE1 | CE2 | CE3 | CE4 | CE5 |
|---|---|---|---|---|---|
| Ethylene/1-octene Elastomer (A1)-1 | 0 | 98.39 | 0 | 14.73 | 0 |
| Ethylene/1-octene Elastomer (A1)-2 | 0 | 0 | 98.39 | 0 | 98.29 |
| LDPE-1 | 98.23 | 0 | 0 | 83.50 | 0 |
| (B1) = $(D^{Vi})_4$ | 1.20 | 1.20 | 1.20 | 1.20 | 1.20 |
| Dicumyl Peroxide (C1) | 0.36 | 0.20 | 0.20 | 0.36 | 0.30 |
| AMSD (D1) | 0.06 | 0.06 | 0.06 | 0.06 | 0.06 |
| Antioxidant (E1) | 0.15 | 0.15 | 0.15 | 0.15 | 0.15 |
| Total | 100 | 100 | 100 | 100 | 100 |

The data in Table 3 indicates that the comparative crosslinkable polyolefin compositions of CE1 to CE5 are not examples of the inventive crosslinkable polyolefin composition.

TABLE 4

Hot Creep characterizations of CE1 to CE5.

| Constituent (weight parts) | CE1 | CE2 | CE3 | CE4 | CE5 |
|---|---|---|---|---|---|
| MDR MH at 182° C. for 12 min. (dN-m) | 1.4 | 2.9 | 1.2 | 1.7 | 2.0 |
| Hot Creep at 200° C. for 15 minutes (%) | 213 | Fail | Fail | Fail | Fail |

As indicated by the data in Table 4, all comparative crosslinkable polyolefin compositions of CE1 to CE5 had hot creep at 200 C. after being held for 15 minutes of significantly greater than the 175% maximum specification. Remarkably, four out of five comparative crosslinkable polyolefin compositions (i.e., CE2 to CE5) had specimen failure (indicated with "Fail") in the hot creep test, meaning the test specimens either broke or stretched to the bottom of the oven during the test, which meant a value for hot creep could not be obtained.

The MDR MH data in Table 4 indicates that after being held at 182° C. in a moving die rheometer for 12 minutes, all but one comparative crosslinkable polyolefin composition failed to make crosslinked polyolefin products having a significant extent of crosslinking (i.e., failed to achieve MH>2.0 dN-m). Only CE2 had MH>2.0 dN-m (i.e., 2.9 dN-m).

The invention claimed is:

1. A crosslinkable polyolefin composition comprising from 100 to 30 weight percent (wt %) of a carrier mixture and from 0 to 70 wt %, respectively, of one or more optional additives;
   wherein the carrier mixture consists of from 97.56 to 99.31 weight percent (wt %) of (A) a polyethylene polymer, from 0.40 to 2.0 wt % of (B) an alkenyl-functional monocyclic organosiloxane, and from 0.29 to 0.44 wt % of (C) an organic peroxide;
   wherein the (A) polyethylene polymer is selected from (A1) and (A2): (A1) an ethylene/alpha-olefin copolymer elastomer having a melt index from 0.6 to 6.2 grams per 10 minutes (g/10 min.) and a density of from 0.854 to 0.912 gram per cubic centimeter (g/cm$^3$), measured according to ASTM D792-13, Method B or (A2) a blend of (A1) and a low-density polyethylene (LDPE) having a melt index of 0.8 to 2.5 g/10 min., wherein the blend has a mass ratio of weight of (A1)-to-weight of (LDPE) ((A1)/(LDPE) wt/wt) of from 99.9/0.1 to 1.0/3.0 and wherein both melt indexes measured according to ASTM D1238-04 (190° C., 2.16 kg; "$I_2$");
   wherein the (B) alkenyl-functional monocyclic organosiloxane is of formula (I): $[R^1,R_2SiO_{2/2}]_n$ (I), wherein subscript n is an integer greater than or equal to 3; each $R^1$ is independently a ($C_2$-$C_4$) alkenyl or a $H_2C{=}C(R^{1a})$—C(=O)—O—$(CH_2)_m$— wherein $R^{1a}$ is H or methyl and subscript m is an integer from 1 to 4; and each $R^2$ is independently H, ($C_1$-$C_4$) alkyl, phenyl, or $R^1$; and
   wherein the carrier mixture of the crosslinkable polyolefin composition has a hot creep of less than 175% after being kept at 200° C. for 15 minutes, as measured by the Hot Creep Test Method;
   with the proviso that the crosslinkable polyolefin composition is free of a phosphazene base; and
   with the proviso that if the melt index ($I_2$) of the (A1) ethylene/alpha-olefin copolymer elastomer is greater than 2 g/10 min., the amount of (C) organic peroxide is from 0.35 to 0.44 wt %.

2. The crosslinkable polyolefin composition of claim 1 wherein the (A) polyethylene polymer is further defined by any one of limitations (i) to (vii):
   (i) the (A) polyethylene polymer is the (A1) ethylene/alpha-olefin copolymer elastomer;
   (ii) the (A) polyethylene polymer is the (A1) ethylene/alpha-olefin copolymer elastomer and (A1) is an ethylene/1-octene copolymer having a melt index from 0.80 to 5.4 g/10 min. and a density of from 0.855 to 0.912 g/cm$^3$;
   (iii) the (A) polyethylene polymer is the (A1) ethylene/alpha-olefin copolymer elastomer and (A1) is an ethylene/1-butene copolymer having a melt index from 0.80 to 5.4 g/10 min. and a density of from 0.859 to 0.890 g/cm$^3$;
   (iv) the (A) polyethylene polymer is the (A2) blend and (A2) is a blend of the ethylene/alpha-olefin copolymer elastomer of any one of limitations (i) to (iii) and the LDPE is an LDPE having a melt index (I2) of from 1.75 to 2.49 g/10 min. and a density of from 0.918 to 0.920 g/cm$^3$;
   (v) the (A) polyethylene polymer is the (A2) blend and (A2) is a blend of the ethylene/alpha-olefin copolymer elastomer of any one of limitations (i) to (iii) and the LDPE is an LDPE having a melt index (I2) of 2.4 g/10 min. and a density of 0.920 g/cm$^3$;
   (vi) the (A) polyethylene polymer is the (A2) blend and (A2) is a blend of the ethylene/alpha-olefin copolymer elastomer of any one of limitations (i) to (iii) and the LDPE is an LDPE having a melt index (I2) of 1.9 g/10 min. and a density of 0.9183 g/cm$^3$; and
   (vii) the (A) polyethylene polymer is the (A2) blend and (A2) is a blend of the ethylene/alpha-olefin copolymer elastomer of any one of limitations (i) to (iii) and the LDPE is an LDPE having a melt index ($I_2$) from 0.80 to 1.24 g/10 min. and a density of from 0.917 to 0.923 g/cm$^3$.

3. The crosslinkable polyolefin composition of claim 1 wherein subscript n is 4 and the (B) monocyclic organosiloxane of formula (I) is described by any one of limitations (i) to (x):
   (i) each $R^1$ is independently a ($C_2$-$C_3$) alkenyl; and each $R^2$ is independently H, ($C_1$-$C_2$) alkyl, or ($C_2$-$C_3$) alkenyl;

(ii) each $R^1$ is vinyl; and each $R^2$ is independently $(C_1-C_2)$ alkyl;
(iii) each $R^1$ is vinyl; and each $R^2$ is methyl;
(iv) each $R^1$ is allyl; and each $R^2$ is independently $(C_1-C_2)$ alkyl;
(v) each $R^1$ is allyl; and each $R^2$ is methyl;
(vi) each $R^1$ is independently $H_2C=C(R^{1a})-C(=O)-O-(CH_2)_m-$ wherein $R^{1a}$ is H or methyl and subscript m is an integer from 1 to 4; and each $R^2$ is independently H, $(C_1-C_2)$ alkyl, or $(C_2-C_3)$ alkenyl;
(vii) each $R^1$ is independently $H_2C=C(R^{1a})-C(=O)-O-(CH_2)_m-$ wherein $R^{1a}$ is H and subscript m is 3; and each $R^2$ is independently $(C_1-C_2)$ alkyl;
(viii) each $R^1$ is independently $H_2C=C(R^{1a})-C(=O)-O-(CH_2)_m-$ wherein $R^{1a}$ is methyl and subscript m is 3; and each $R^2$ is independently $(C_1-C_2)$ alkyl;
(ix) the crosslinkable polyolefin composition does not contain 24 wt % or more of any inorganic filler; and
(x) a combination of limitation (ix) and any one of limitations (i) to (viii).

4. The crosslinkable polyolefin composition of claim 1 further comprising from 0.01 to 0.10 wt % of (D) an anti-scorch agent or from 0.10 to 0.30 wt % of (E) an antioxidant or a combination of (D) and (E); and wherein an embodiment of the crosslinkable polyolefin composition consisting of constituents (A) to (E) has a hot creep of less than 175% after being kept at 200° C. for 15 minutes, as measured by the Hot Creep Test Method.

5. The crosslinkable polyolefin composition of claim 1 wherein the crosslinkable composition comprises the carrier mixture and the one or more additives; wherein the one or more additives are selected from the group consisting of additives (F) to (M): (F) a filler; (G) a flame retardant; (H) a hindered amine stabilizer; (I) a tree retardant; (J) a methyl radical scavenger; (K) a conventional coagent, (L) a nucleating agent, and (M) carbon black; with the proviso that the (F) filler does not include any previously omitted filler.

6. A method of making the crosslinkable polyolefin composition of claim 1, the method comprising mixing the amount of the (A) polyethylene polymer; the amount of the (B) monocyclic organosiloxane of formula (I), and the amount of the (C) organic peroxide together to make the carrier mixture.

7. A method of free-radical curing the crosslinkable polyolefin composition of claim 1 to make a crosslinked polyolefin product, the method comprising heating the crosslinkable polyolefin composition at a curing effective temperature in such a way so as to react the (A) polyethylene polymer with the (B) monocyclic organosiloxane of formula (I), thereby making a crosslinked polyolefin product.

8. A crosslinked polyolefin product made by the method of curing of claim 7.

9. A manufactured article comprising a shaped form of the crosslinkable polyolefin composition of claim 1.

10. A coated conductor comprising a conductive core and an insulation layer at least partially covering the conductive core, wherein at least a portion of the insulation layer comprises the crosslinkable polyolefin composition of claim 1.

11. A method of transmitting electricity, the method comprising applying a voltage across the conductive core of the coated conductor of claim 10 so as to generate a flow of electricity through the conductive core.

* * * * *

UNITED STATES PATENT AND TRADEMARK OFFICE
CERTIFICATE OF CORRECTION

PATENT NO. : 12,269,960 B2
APPLICATION NO. : 17/756668
DATED : April 8, 2025
INVENTOR(S) : Paul J. Brigandi et al.

It is certified that error appears in the above-identified patent and that said Letters Patent is hereby corrected as shown below:

In the Claims

In Claim 2, Column 22, Line 42, replace line "LDPE is an LDPE having a melt index (12) of from" with --LDPE is an LDPE having a melt index ($I_2$) of from--

In Claim 2, Column 22, Line 48, replace line "LDPE is an LDPE having a melt index (12) of 2.4 g/10" with --LDPE is an LDPE having a melt index ($I_2$) of 2.4 g/10--

In Claim 2, Column 22, Line 53, replace line "LDPE is an LDPE having a melt index (12) of 1.9 g/10" with --LDPE is an LDPE having a melt index ($I_2$) of 1.9g/10--

Signed and Sealed this
Sixteenth Day of September, 2025

Coke Morgan Stewart
*Acting Director of the United States Patent and Trademark Office*